(12) United States Patent
Momen

(10) Patent No.: US 8,960,356 B2
(45) Date of Patent: Feb. 24, 2015

(54) STEERING WHEEL AND TRAFFIC SLOGAN DISPLAY

(76) Inventor: Kenji Momen, Takaishi (JP)

(*) Notice: Subject to any disclaimer, the term of this patent is extended or adjusted under 35 U.S.C. 154(b) by 0 days.

(21) Appl. No.: 13/545,098

(22) Filed: Jul. 10, 2012

(65) Prior Publication Data
US 2013/0319171 A1 Dec. 5, 2013

(30) Foreign Application Priority Data

May 30, 2012 (JP) ............... 2012-003221 U

(51) Int. Cl.
B60R 21/00 (2006.01)
G09F 13/20 (2006.01)
G09F 21/04 (2006.01)

(52) U.S. Cl.
USPC ............... 180/271; 40/542; 40/593; 280/731

(58) Field of Classification Search
USPC ............ 40/542, 543, 591, 593; 180/271; 280/731
See application file for complete search history.

(56) References Cited

U.S. PATENT DOCUMENTS

| | | | | | |
|---|---|---|---|---|---|
| 2,156,409 | A | * | 5/1939 | Stobbe | 40/542 |
| 2,347,285 | A | * | 4/1944 | Russell | 40/542 |
| 2,548,488 | A | * | 4/1951 | Mella | 40/518 |
| 3,237,330 | A | * | 3/1966 | Dinstbir | 40/593 |
| 4,377,750 | A | * | 3/1983 | Pape et al. | 250/458.1 |
| 4,841,155 | A | * | 6/1989 | Ushida et al. | 250/463.1 |
| 5,032,711 | A | * | 7/1991 | Yamada | 250/461.1 |
| 5,811,174 | A | * | 9/1998 | Murakami | 428/195.1 |
| 5,992,028 | A | * | 11/1999 | Wing | 33/194 |
| 6,003,895 | A | * | 12/1999 | Niwa et al. | 280/728.3 |
| 6,099,027 | A | * | 8/2000 | Shirk et al. | 280/728.3 |
| 6,105,999 | A | * | 8/2000 | Johnson | 280/727 |
| 6,390,538 | B1 | * | 5/2002 | Hashimoto et al. | 296/187.05 |
| 6,395,219 | B1 | * | 5/2002 | Preisler et al. | 264/513 |
| 6,546,659 | B1 | * | 4/2003 | Imai et al. | 40/662 |
| 6,568,704 | B2 | * | 5/2003 | Iida et al. | 280/728.3 |
| 6,581,311 | B1 | * | 6/2003 | Davey et al. | 40/593 |
| 6,613,415 | B2 | * | 9/2003 | Iida et al. | 428/139 |
| 6,634,532 | B1 | * | 10/2003 | Maguire | 224/483 |
| 6,966,575 | B2 | * | 11/2005 | Kobayashi et al. | 280/728.3 |
| 7,387,397 | B2 | * | 6/2008 | Konet et al. | 362/84 |
| 7,457,695 | B1 | * | 11/2008 | Fields et al. | 701/36 |
| 7,622,169 | B2 | * | 11/2009 | Oh | 428/31 |
| 7,766,371 | B2 | * | 8/2010 | Fujimori et al. | 280/728.3 |
| 8,196,953 | B2 | * | 6/2012 | Weigand et al. | 280/728.3 |
| 2010/0154261 | A1 | * | 6/2010 | Bozlo et al. | 40/541 |
| 2011/0116251 | A1 | * | 5/2011 | Rick | 362/84 |
| 2012/0001406 | A1 | * | 1/2012 | Paxton et al. | 280/728.3 |

FOREIGN PATENT DOCUMENTS

JP 2000-235693 8/2000

* cited by examiner

Primary Examiner — Paul N Dickson
Assistant Examiner — Laura Freedman
(74) Attorney, Agent, or Firm — Wenderoth, Lind & Ponack, L.L.P.

(57) ABSTRACT

A steering wheel raises the awareness of a driver of a vehicle or the like concerning safe driving during operation of the vehicle, leading to a reduction of traffic accidents and violations of traffic regulations. The steering wheel has a pad section nearly in the center of a steering section gripped by the driver. A traffic slogan display unit having a character section displaying a traffic slogan and a background section being other than the character section is formed on the pad section.

10 Claims, 4 Drawing Sheets

STEERING WHEEL AND TRAFFIC SLOGAN DISPLAY

BACKGROUND OF THE INVENTION

1. Field of the Invention

The present invention relates to a steering wheel and a traffic slogan display and, more particularly, to a steering wheel which can raise awareness of a driver concerning safe driving and a traffic slogan display.

2. Description of the Relevant Art

Hitherto, as a means of raising awareness concerning safe driving, various kinds of traffic safety stickers to be stuck on the window or body of a vehicle, and good-luck charms attached inside a vehicle to pray for traffic safety have been known. And in the below-mentioned Patent Document 1, a traffic slogan output device which outputs to display a slogan for traffic safety (a traffic slogan) depending on personal conditions of a driver or driving conditions has been disclosed.

However, with only the above-mentioned stickers or traffic slogan output device attached inside the vehicle, it is difficult to raise and keep the driver's awareness concerning safe driving during operation of the vehicle and keep it.

A driver who voluntarily attaches the above-mentioned stickers or traffic slogan output device is considered as having relatively high awareness concerning safe driving, but in order to enhance the effect of reducing traffic accidents and violations of traffic regulations in the whole society, it is extremely important to make more drivers naturally aware of observing traffic regulations in driving.

Safety devices such as a brake system and an air bag system, and a device which warns about not wearing a seatbelt or the like are standard equipment on general cars for private use. On the other hand, as a device for raising awareness of a driver concerning safe driving during operation of a car, there is a navigation system. It is considered that the voice guidance thereof has a function of cautioning the driver. However, the navigation system is generally expensive, and it is not included as standard in all cars.

As described above, a measure to spread the effect of keeping and raising awareness of drivers concerning safe driving at a low cost and with reliability in the whole society (motorized society) has not been sufficiently conducted.

[Patent Document 1] Japanese Patent Application Laid-Open Publication No. 2000-235693

SUMMARY OF THE INVENTION

The present invention was developed in order to solve the above problem, and it is an object of the present invention to provide a steering wheel and a traffic slogan display which can naturally raise awareness of a driver concerning safe driving during operation of a vehicle, spread the effect of keeping and raising the driver's awareness concerning safe driving at a low cost and with reliability in the whole society, and reduce traffic accidents and violations of traffic regulations.

In order to achieve the above object, a steering wheel according to a first aspect of the present invention has a pad section nearly in the center of a steering section to be gripped by a driver. A traffic slogan display unit having a character section displaying a traffic slogan and a background section other than the character section is formed on the pad section.

When the steering wheel according to the first aspect of the present invention is used, since the traffic slogan display unit is formed on the pad section, the traffic slogan display unit easily enters the driver's field of vision even if the driver is gripping the steering section to drive, resulting in enhancing the effect of making the driver naturally aware of the traffic slogan display unit. Furthermore, through the driver's action of gripping the steering section, the driver can feel at one with the steering wheel with the traffic slogan display unit mounted on the pad section. It becomes possible to make the driver more aware of the traffic slogan shown on the traffic slogan display unit involuntarily.

Therefore, by a combined effect of the effect of the traffic slogan display unit naturally entering the driver's field of vision with the psychological effect of enhancing awareness through the feeling of unity with the steering wheel, the driver's awareness concerning safe driving during operation of a vehicle can be reliably kept and raised.

With the steering wheel according to the first aspect of the present invention mounted on a vehicle or the like as a standard specification, the effect of keeping and raising the driver's awareness concerning safe driving can be spread in the whole society at a low cost and with reliability, leading to a reduction of traffic accidents and violations of traffic regulations in the whole society.

The steering wheel according to a second aspect of the present invention is characterized by the character section which is formed so as to be convex or concave to the background section in the steering wheel according to the first aspect of the present invention.

When the steering wheel according to the second aspect of the present invention is used, since the character section is formed so as to be convex or concave to the background section, it is easy for the driver to visually recognize the character section. Even in driving, it is possible to further enhance the effect of making the driver naturally aware of the traffic slogan display unit.

The steering wheel according to a third aspect of the present invention is characterized by the character section and the background section which are colored in different colors in the steering wheel according to the first or second aspect of the present invention.

When the steering wheel according to the third aspect of the present invention is used, since the character section and the background section are colored in different colors, it is possible to make the character section prominent against the background section. Therefore, the character section easily enters the driver's field of vision, resulting in enhancing the effect of making the driver naturally aware of the traffic slogan display unit, and improving the visibility of the character section.

The steering wheel according to a fourth aspect of the present invention is characterized by the character section and/or the background section being colored with a coloring material containing a fluorescent material or a phosphorescent material in the steering wheel according to the third aspect of the present invention.

When the steering wheel according to the fourth aspect of the present invention is used, since the character section and/or the background section are colored with the coloring material containing a fluorescent material or a phosphorescent material, it is possible to make the character section prominent against the background section during the day or even at night. Therefore, the character section easily enters the driver's field of vision and becomes easy to visually recognize, resulting in enhancing the effect of making the driver naturally aware of the traffic slogan display unit and further improving the visibility of the character section.

The steering wheel according to a fifth aspect of the present invention is characterized by a lens layer for magnifying the character section, which is formed on the surface of the traffic slogan display unit in the steering wheel according to any one of the first to fourth aspects of the present invention.

When the steering wheel according to the fifth aspect of the present invention is used, since the lens layer which magnifies the character section is formed on the surface of the traffic slogan display unit, it is possible to allow the driver to visually recognize the character section of the traffic slogan display unit in a magnified state even if the area of the traffic slogan display unit is relatively small, resulting in improving the effect of enhancing awareness.

The steering wheel according to a sixth aspect of the present invention is characterized by the traffic slogan display unit on which characters of safe drive and/or obey rule are formed in the steering wheel according to any one of the first to fifth aspects of the present invention.

When the steering wheel according to the sixth aspect of the present invention is used, since the characters of safe drive and/or obey rule are formed on the traffic slogan display unit, it is possible to make the driver more aware of driving safely and/or driving with observance of the rules.

A traffic slogan display according to a first aspect of the present invention is characterized by a traffic slogan display to be mounted on a steering wheel, comprising a mounting section for mounting on the steering wheel, a traffic slogan display unit having a character section displaying a traffic slogan and a background section being other than the character section, and a protecting section to protect the traffic slogan display unit. The character section is formed so as to be convex or concave to the background section.

In the traffic slogan display according to the first aspect of the present invention, the character section is formed so as to be convex or concave on the traffic slogan display unit. Therefore, by mounting the traffic slogan display on the steering wheel of a vehicle or the like, the character section easily enters a driver's field of vision even if the driver is gripping the steering wheel to drive, resulting in enhancing the effect of making the driver naturally aware of the character section. Furthermore, through the driver's action of gripping the steering wheel, the driver can feel at one with the steering wheel on which the traffic slogan display is mounted. It becomes possible to make the driver more aware of the traffic slogan shown on the character section involuntarily.

Therefore, by a combined effect of the character section naturally entering the driver's field of vision with the psychological effect of enhancing awareness through the feeling of unity with the steering wheel, the driver's awareness concerning safe driving during operating the vehicle can be reliably kept and raised.

With the traffic slogan display according to the first aspect of the present invention mounted on a vehicle or the like as a standard specification, the effect of keeping and raising the driver's awareness concerning safe driving can be spread in the whole society at a low cost and with reliability, leading to a reduction of traffic accidents and violations of traffic regulations in the whole society.

The traffic slogan display according to a second aspect of the present invention is characterized by the character section and the background section colored in different colors in the traffic slogan display according to the first aspect of the present invention.

When the traffic slogan display according to the second aspect of the present invention is used, since the character section and the background section are colored in different colors, it is possible to make the character section prominent against the background section. Therefore, the character section easily enters the driver's field of vision, resulting in enhancing the effect of making the driver naturally aware of the character section, and improving the visibility of the character section.

The traffic slogan display according to a third aspect of the present invention is characterized by the character section and/or the background section which are colored with a coloring material containing a fluorescent material or a phosphorescent material in the traffic slogan display according to the first or second aspect of the present invention.

When the traffic slogan display according to the third aspect of the present invention is used, since the character section and/or the background section are colored with the coloring material containing a fluorescent material or a phosphorescent material, it is possible to make the character section prominent against the background section during the day or even at night. Therefore, the character section easily enters the driver's field of vision and becomes easy to visually recognize, resulting in enhancing the effect of making the driver naturally aware of the traffic slogan shown on the character section and further improving the visibility of the character section.

The traffic slogan display according to a fourth aspect of the present invention is characterized by the protecting section comprising a lens layer for magnifying the character section in the traffic slogan display according to any one of the first to third aspects of the present invention.

When the traffic slogan display according to the fourth aspect of the present invention is used, since the protecting section comprises the lens layer which magnifies the character section, it is possible to allow the driver to visually recognize the character section of the traffic slogan display unit in a magnified state even if the area of the traffic slogan display unit is relatively small, resulting in improving the effect of enhancing awareness.

The traffic slogan display according to a fifth aspect of the present invention is characterized by the character section on which characters of safe drive and/or obey rule are formed in the traffic slogan display according to any one of the first to fourth aspects of the present invention.

When the traffic slogan display according to the fifth aspect of the present invention is used, since the characters of safe drive and/or obey rule are formed on the character section, it is possible to make the driver more aware of driving safely and/or driving with observance of the rules.

DESCRIPTION OF THE PREFERRED EMBODIMENTS

Figure 1:
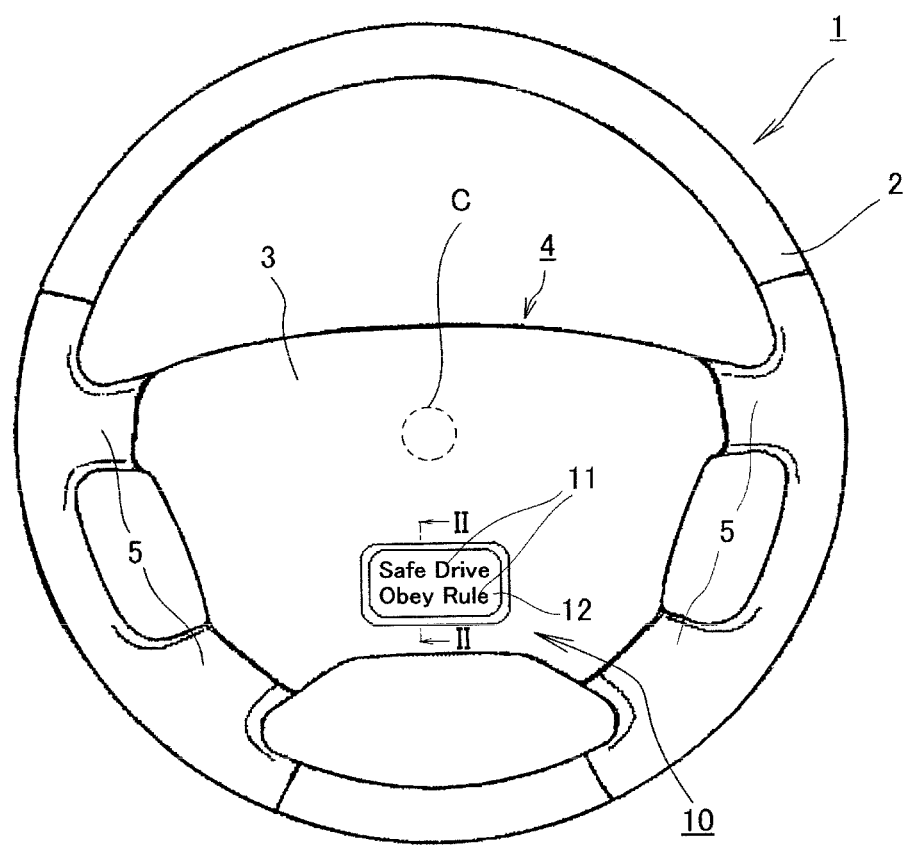
FIG. 1 is a plan view illustrating a steering wheel according an embodiment of the present invention.
Figure 2:
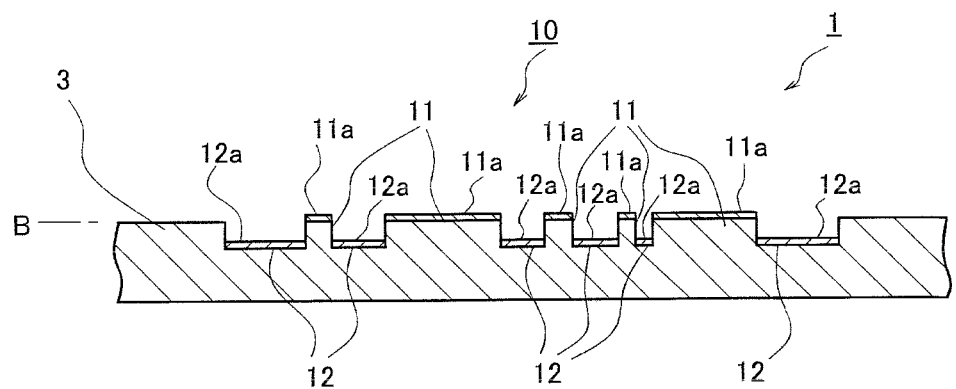
FIG. 2 is an enlarged cross-sectional view taken from line II-II of FIG. 1.

The preferred embodiments of the steering wheel and the traffic slogan display according to the present invention are described below by reference to the Figures noted above. FIG. 1 is a plan view illustrating a steering wheel according to an embodiment, and FIG. 2 is an enlarged cross-sectional view taken from line II-II of FIG. 1.

A steering wheel 1 is fixed to a steering shaft (not shown) in front of the driver's seat inside a car, and the front of the steering wheel 1 is arranged so as to face obliquely upward.

The steering wheel 1 comprises a ring-shaped steering section (or a rim section) 2, a steering body 4 having a pad section (or a steering pad) 3 arranged nearly in the center of the steering section 2, and multiple spoke sections 5 with which the steering body 4 and the steering section 2 are coupled.

The steering section 2 is formed by covering a rim core with a covering material such as a synthetic resin or leather. The spoke section 5 has a spoke core (not shown) inside, which is covered with a cover.

The steering body 4 comprises the pad section 3 on the front thereof, and a cover (not shown) which covers a boss section (not shown) fitted around the steering shaft (not shown) located on the back thereof. Inside the pad section 3, a horn, an air bag system (not shown) and the like are accommodated. The pad section 3 and the cover are molded of a synthetic resin material in prescribed shapes.

On the pad section 3, a traffic slogan display unit 10 is formed. The traffic slogan display unit 10 has a character section 11 which displays a traffic slogan and a background section 12 which is other than the character section 11, and as shown in FIG. 2, the character section 11 is formed so as to be convex to the background section 12.

In this embodiment, characters of 'Safe Drive' and 'Obey Rule' are formed on the character section 11 of the traffic slogan display unit 10. Traffic slogans formed on the character section 11 are not limited to safe drive and obey rule, but it is preferable that slogans which are short and have a high effect of enhancing awareness concerning safety should be adopted. And the language used for the traffic slogans formed on the character section 11 is not limited to Japanese. Every language such as English or Chinese can be adopted.

On the character section 11 and the background section 12, colored layers 11a and 12a, colored in different colors, are formed, respectively. Therefore, the traffic slogan display unit 10 can easily enter a driver's field of vision and the character section 11 is easy to visually recognize. The applied colors are not particularly limited, but it is preferable that a combination of colors which makes it easy to distinguish between the character section 11 and the background section 12 should be chosen. For example, the colored layer 12a of the background section 12 may be colored in yellow, while the colored layer 11a of the character section 11 may be colored in black, red, or green. Or to color the colored layers 11a and 12a, respectively, not only one color but also a combination of multiple colors can be adopted. For example, the colored layer 11a can be formed so that the characters of a traffic slogan displayed on the character section 11 are edged with another color.

As a coloring material which forms the colored layers 11a and 12a, a coating material suitable for coloring the pad section 3 made of a synthetic resin can be adopted. Or a coloring material containing a fluorescent material or a phosphorescent material can be also used. By such construction, it becomes possible to make the character section 11 prominent against the background section 12 during the day or even at night. The character section 11 easily enters the driver's field of vision and is easy to visually recognize, resulting in further enhancing the effect of making the driver naturally aware of the traffic slogan display unit 10.

Here, in the traffic slogan display unit 10 shown in FIG. 2, the top of the character section 11 and the base surface B of the pad section 3 are formed so as to be almost even, but in another embodiment, a traffic slogan display unit 10 may be formed (molded) so as to cause the convex portion of a character section 11 to be higher than the base surface B of a pad section 3. By such construction, the effect of allowing the character section 11 to visually stand out can be enhanced.

The location where the traffic slogan display unit 10 is formed is not particularly limited, as long as it is within the pad section 3, but since it is possible to obtain the effect of keeping and raising awareness even when the traffic slogan display unit 10 enters the driver's field of vision just a little, it is preferably formed so as to be located lower than the center C of the steering section 2, that is, in the lower part of the pad section 3.

The size (area) of the traffic slogan display unit 10 is preferably selected so as not to spoil the design of the steering wheel 1 (about 5 cm square or smaller, more preferably about 4 cm or smaller), since the effect of enhancing awareness can be obtained even with a relatively small unit.

When the steering wheel 1 according to the above embodiment is used, since the traffic slogan display unit 10 is formed on the pad section 3, the traffic slogan display unit 10 easily enters the driver's field of vision even if the driver is gripping the steering section 2 to drive, resulting in enhancing the effect of making the driver naturally aware of the traffic slogan display unit 10. Furthermore, through the driver's action of gripping the steering section 2, the driver can feel at one with the steering wheel 1 on which the traffic slogan display unit 10 is mounted. It becomes possible to allow the driver to be more aware of the traffic slogans (safe drive and obey rule) displayed on the traffic slogan display unit 10 involuntarily.

Therefore, by a combined effect of the effect of the traffic slogan display unit 10 naturally entering the driver's field of vision with a psychological effect of enhancing awareness through the feeling of unity with the steering wheel 1, the driver's awareness concerning safe driving during operation of a vehicle can be reliably kept and raised.

Since the character section 11 is formed so as to be convex to the background section 12, it is easy for the driver to visually recognize the character section 11 and it is possible to further enhance the effect of making the driver naturally aware of the traffic slogan display unit 10 even in driving.

Since the colored layers 11a and 12a, which are different in color, are formed on the character section 11 and the background section 12, respectively, it is possible to make the character section 11 prominent against the background section 12. The character section 11 easily enters the driver's field of vision, resulting in enhancing the effect of making the driver naturally aware of the traffic slogan display unit 10, and improving the visibility of the character section 11.

Therefore, with the steering wheel 1 mounted on a vehicle or the like as the standard specifications, the effect of keeping and raising the driver's awareness concerning safe driving can be spread in the whole society at a low cost and with reliability, leading to a reduction of traffic accidents and violations of traffic regulations in the whole society.

Figure 3:
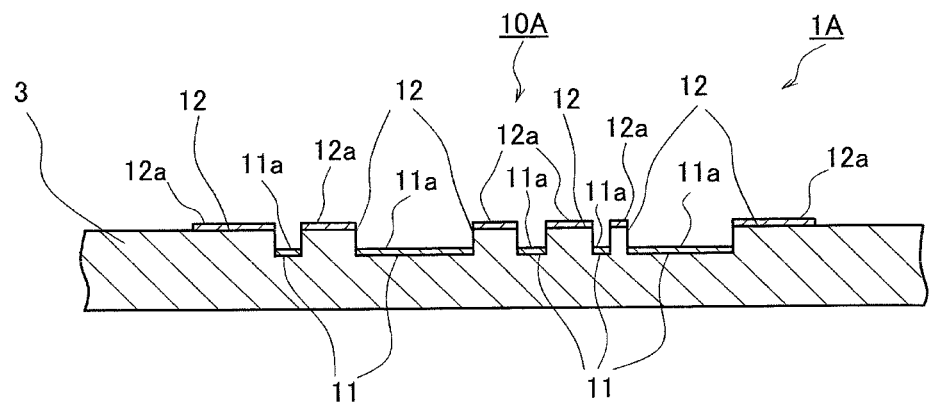
FIG. 3 is an enlarged cross-sectional view of a traffic slogan display unit of a steering wheel according to another embodiment.

Here, in this embodiment, as shown in FIG. 2, the case in which the character section 11 of the traffic slogan display unit 10 is formed so as to be convex to the background section 12 has been described, but in a steering wheel 1A according to another embodiment, as shown in FIG. 3, a character section 11 of a traffic slogan display unit 10A can be formed so as to be concave to a background section 12. Or without forming the character section 11 and the background section 12 so as to be uneven, only colored layers 11a and 12a can be formed.

Figure 4:
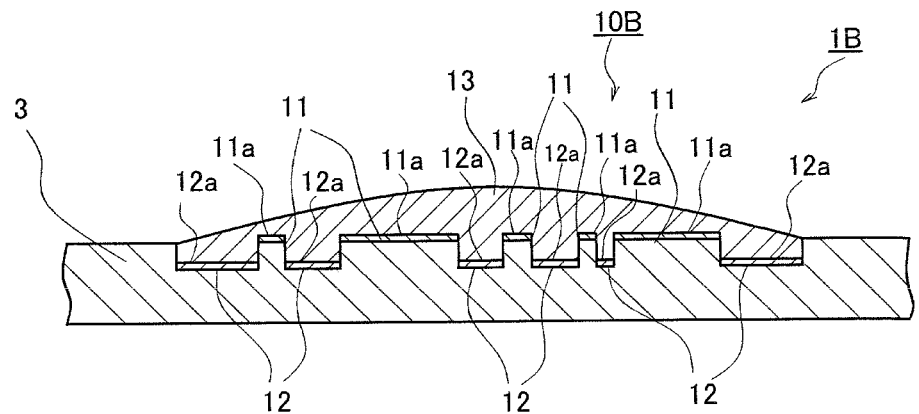
FIG. 4 is an enlarged cross-sectional view of a traffic slogan display unit of a steering wheel according to still another embodiment.

In a steering wheel 1B according to still another embodiment, as shown in FIG. 4, a lens layer 13, which is convex (curved), for magnifying a character section 11 can be formed on the surface of a traffic slogan display unit 10B. As the lens layer 13, for example, a layer molded of a transparent resin material having transparency such as acrylic or a polycarbonate can be adopted.

By such construction, since the lens layer 13 which magnifies the character section 11 is formed on the surface of the traffic slogan display unit 10B, it is possible to allow the driver to visually recognize the character section 11 of the traffic slogan display unit 10B in a magnified state even if the area of the traffic slogan display unit 10B is relatively small. As a result, the character section 11 easily enters the driver's field of vision and the effect of enhancing awareness can be improved.

In the above embodiment, the case in which the traffic slogan display unit 10 is formed on the pad section 3 as one body has been described, but in another embodiment, a traffic slogan display as an alternative to the traffic slogan display unit 10 is produced separately from the pad section 3, and the traffic slogan display can be mounted in a prescribed position of the pad section 3 (the lower part of the pad section 3).

Figure 5:
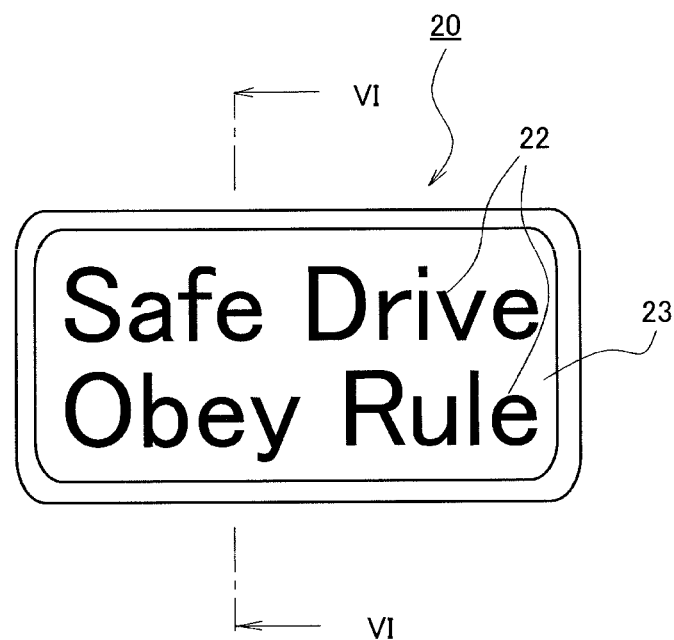
FIG. 5 is a plan view illustrating a traffic slogan display according to an embodiment.
Figure 6:
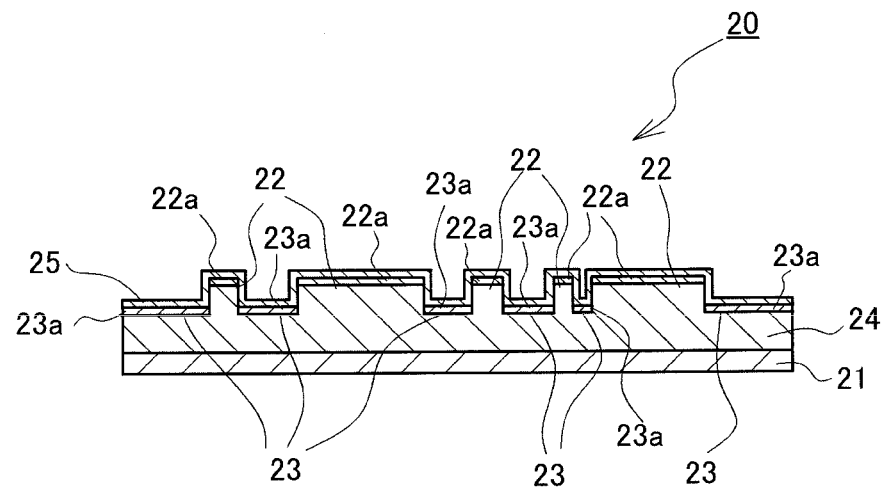
FIG. 6 is an enlarged cross-sectional view taken from line VI-VI of FIG. 5.

FIG. 5 is a plan view illustrating a traffic slogan display according to an embodiment, and FIG. 6 is a cross-sectional view taken from line VI-VI of FIG. 5.

A traffic slogan display 20 is to be mounted on a steering wheel, and as shown in FIG. 6, comprises a mounting section 21 for mounting on the steering wheel, a traffic slogan display unit 24 having a character section 22 displaying a traffic slogan and a background section 23 being other than the character section 22, and a protecting section 25 to protect the traffic slogan display unit 24. On the traffic slogan display unit 24, the character section 22 is formed so as to be convex to the background section 23. The size (area) of the traffic slogan display 20 is preferably selected, for example, so as not to spoil the design of the steering wheel (about 5 cm square or smaller, more preferably about 4 cm square or smaller).

The mounting section 21 can comprise a fixing member such as a double-sided adhesive tape, but it is not particularly limited, as long as the member can be fixed to a pad section (not shown) of the steering wheel. For example, a construction in which a locking claw is formed on a backside rim portion of the traffic slogan display 20 and the locking claw is engaged in an engaging portion formed on the pad section, mounting on the pad section with a screw or the like can be adopted.

The protecting section 25 comprises members to protect the surface of the traffic slogan display unit 24, comprising a coating layer made of various kinds of coating materials, a seal layer made of a seal material and the like.

The traffic slogan display unit 24 is formed, for example, molded of a synthetic resin or a thin metal plate so that the character section 22 becomes convex to the background section 23. In this embodiment, the characters of 'Safe Drive' and 'Obey Rule' are formed on the character section 22. The slogans formed on the character section 22 are not limited to safe drive and obey rule, but it is preferable that slogans which are short and have a high effect of enhancing awareness concerning safety should be adopted. The language of the traffic slogans displayed on the character section 22 is not limited to Japanese. In another embodiment, every language such as English or Chinese can be adopted.

Furthermore, on the character section 22 and the background section 23, respectively, colored layers 22a and 23a, which are different in color, are formed. Therefore, the traffic slogan display 20 easily enters the driver's field of vision, and the character section 22 is easy to visually recognize. The applied colors are not particularly limited, but it is preferable that a combination of colors which makes it easy to distinguish between the character section 22 and the background section 23 should be chosen. For example, the colored layer 23a of the background section 23 may be colored in yellow, while the colored layer 22a of the character section 22 may be colored in black, red, or green. Or the colored layers 22a and 23a can be colored not only with one color but also with a combination of multiple colors. For example, the colored layer 22a can be formed so that the characters of the traffic slogans displayed on the character section 22 are edged with another color.

The coloring material which forms the colored layers 22a and 23a is not particularly limited. A coating material suitable for a member constituting the traffic slogan display unit 24 and the like is used. Or a coloring material containing a fluorescent material or a phosphorescent material can be also used. By such construction, it becomes possible to make the character section 22 prominent against the background section 23 during the day or even at night. The character section 22 easily enters the driver's field of vision and becomes easy to visually recognize, resulting in further enhancing the effect of making the driver naturally aware of the traffic slogan display 20.

In the traffic slogan display 20 according to the above embodiment, the character section 22 displaying the traffic slogans is formed on the traffic slogan display unit 24. Therefore, by mounting on a steering wheel of a vehicle or the like, the character section 22 easily enters the driver's field of vision even if the driver is gripping the steering wheel to drive, resulting in enhancing the effect of making the driver naturally aware of the character section 22. Furthermore, through the driver's action of gripping the steering wheel, the driver can feel at one with the steering wheel on which said traffic slogan display 20 is mounted, resulting in making the driver more aware of the traffic slogans displayed on the character section 22 involuntarily.

Therefore, by a combined effect of the effect of the character section 22 naturally entering the driver's field of vision with a psychological effect of enhancing awareness through the feeling of unity with the steering wheel, the driver's awareness concerning safe driving during operation of a vehicle can be reliably kept and raised.

As a result, by mounting the traffic slogan display 20 on the steering wheel of a vehicle or the like as a standard specification, the effect of keeping and raising the driver's awareness concerning safe driving can be spread in the whole society at a low cost and with reliability, leading to a reduction of traffic accidents and violations of traffic regulations in the whole society.

Since the colored layers 22a and 23a, which are different in color, are formed on the character section 22 and the background section 23 of the traffic slogan display unit 24, respectively, it is possible to make the character section 22 prominent against the background section 23. As a result, the character section 22 easily enters the driver's field of vision, resulting in enhancing the effect of making the driver naturally aware of the character section 22, and further improving the visibility of the character section 22.

Figure 7:
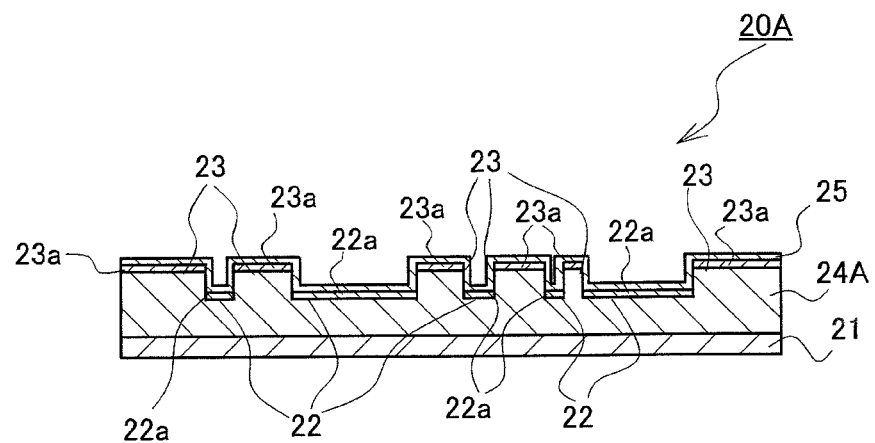
FIG. 7 is an enlarged cross-sectional view of a traffic slogan display according to another embodiment.

Here, in the above embodiment, as shown in FIG. 6, the case in which the character section 22 of the traffic slogan display unit 24 is formed so as to be convex to the background section 23 has been described, but in a traffic slogan display 20A according to another embodiment, as shown in FIG. 7, a character section 22 of a traffic slogan display unit 24A can be formed so as to be concave to a background section 23.

Figure 8:
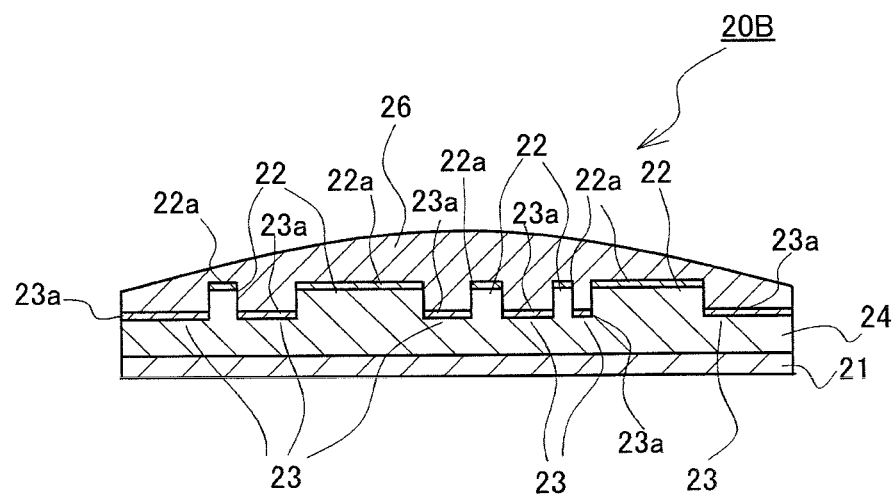
FIG. 8 is an enlarged cross-sectional view of a traffic slogan display according to still another embodiment.

In a traffic slogan display 20B according to still another embodiment, as shown in FIG. 8, a convex lens section 26 for magnifying a character section 22 can be formed as an alternative to a protecting section 25 on the surface of a traffic slogan display unit 24. The convex lens section 26, for example, which is molded of a resin having transparency such as acrylic or a polycarbonate, can be used.

By such construction, since the convex lens section 26 which can magnify the character section 22 is formed on the surface of the traffic slogan display unit 24, it is possible to allow the driver to visually recognize the character section 22 of the traffic slogan display unit 24 in a magnified state even if the area of the traffic slogan display 20A is relatively small. The character section 22 easily enters the driver's field of vision, resulting in improving the effect of enhancing awareness.

In the above embodiment, the case of applying to the steering wheel of a vehicle for private use has been described, but the steering wheel to which the traffic slogan display can be applied is not limited to the vehicle for private use. It can be applied to every steering wheel mounted on large-sized vehicles such as a bus and a truck, industrial vehicles such as a forklift, construction vehicles such as a crane, agricultural vehicles such as a tractor, railway vehicles, varied two-wheeled vehicles, varied ships, varied airplanes, and the like.

By encouraging mounting of a steering wheel having the above-described traffic slogan display unit on every kind of vehicles, vehicle accidents, ship accidents, plane accidents, and the like can be reduced in the whole society, and the driving manners of drivers can be improved.

What is claimed is:

1. A traffic slogan display to be mounted on a steering wheel having a steering section to be gripped by a driver and a pad section located centrally in the steering section, said traffic slogan display comprising:
    a traffic slogan display unit having a character section displaying a traffic slogan and a background section other than said character section, wherein said character section is formed so as to be convex or concave with respect to said background section so that said traffic slogan display unit has an uneven surface;
    a mounting section comprising double sided adhesive tape for mounting said traffic slogan display unit on the pad section of the steering wheel;
    a protecting section protecting said traffic slogan display unit; and
    colored layers made of coating materials of different colors formed in said character section and said background section, respectively;
    wherein said protecting section comprises a lens layer magnifying said character section, said lens layer formed in a body and in a manner so as to adhere closely to the upper surface of cavities formed by said uneven surface of said traffic slogan display unit.

2. The traffic slogan display according to claim 1, wherein at least one of said character section and said background section are colored with a coating material of said coating materials that contains a fluorescent material or a phosphorescent material.

3. A steering wheel having a steering wheel section to be gripped by a driver, a pad section located centrally in the steering section and the traffic slogan display unit according to claim 2 mounted on the pad section by said double sided adhesive tape.

4. The traffic slogan display according to claim 1, wherein said traffic slogan of said character section comprises the characters obey rule.

5. A steering wheel having a steering wheel section to be gripped by a driver, a pad section located centrally in the steering section and the traffic slogan display unit according to claim 4 mounted on the pad section by said double sided adhesive tape.

6. A steering wheel having a steering wheel section to be gripped by a driver, a pad section located centrally in the steering section and the traffic slogan display unit according to claim 1 mounted on the pad section by said double sided adhesive tape.

7. A traffic slogan display to be mounted on a steering wheel having a steering section to be gripped by a driver and a pad section located centrally in the steering section, said traffic slogan display comprising:
    a traffic slogan display unit having a character section displaying a traffic slogan and a background section other than said character section, wherein said character section is formed so as to be convex or concave with respect to said background section so that said traffic slogan display unit has an uneven surface;
    a mounting section comprising double sided adhesive tape for mounting said traffic slogan display unit on the pad section of the steering wheel;
    a protecting section protecting said traffic slogan display unit; and
    colored layers made of coating materials of different colors formed in said character section and said background section, respectively;
    wherein said character section and said background section together form concavities and convexities in said uneven surface of said traffic slogan display unit, wherein said protection section comprises a lens layer for magnifying said character section, wherein said lens layer is formed in a body and in a manner so that said lens layer extends into said concavities and so that said lens layer adheres closely to an upper surface of said concavities and an upper surface of said convexities.

8. The traffic slogan display of claim 7, wherein said lens layer comprises molded transparent resin.

9. A steering wheel having a steering wheel section to be gripped by a driver, a pad section located centrally in the steering section and the traffic slogan display unit according to claim 8 mounted on the pad section by said double sided adhesive tape.

10. A steering wheel having a steering wheel section to be gripped by a driver, a pad section located centrally in the steering section and the traffic slogan display unit according to claim 7 mounted on the pad section by said double sided adhesive tape.

* * * * *